Patented June 7, 1927.

1,631,287

UNITED STATES PATENT OFFICE.

VITUS POTMAKER, OF SAN FRANCISCO, CALIFORNIA.

PIE-FILLING COMPOUND.

No Drawing.      Application filed February 8, 1926. Serial No. 86,925.

This invention relates to a pie filler, and it is intended to provide a healthful composition which can be used as a thickening for fruit pies, lemon cream or chocolate pies and other pies of that character to take the place of corn starch often used in such pies.

The pie filler is made as follows: Two pounds of selected hard wheat is carefully cleaned and washed. The wheat is then soaked in water for about 48 hours, after which it is drained and allowed to stand in shallow trays in a room at a temperature of about 75° F. for about two weeks. This will cause the wheat to sprout after which it is drained and dried for several hours. The wheat is then rubbed through a mill or screen with about three pints of water, thereby producing a mash, after which about 1¼ pounds of whole wheat flour which has been roasted in an oven at a temperature of between 300° and 400° F. until it has lost about 20% of its weight is mixed with the mass. This mass is then rubbed through a screen of about 20 to 25 meshes to the inch, and the material passing the screen is then of a more or less mushy consistency which is used as the filler. This material is then used in such quantities as is needed to take the place of the thickening corn starch often used in pies or other food products as may be desired.

Having thus described my invention, what I desire to secure by Letters Patent of the United States is as follows, but modifications may be made in carrying out the invention within the purview of the annexed claims.

1. A pie filling compound comprising macerated sprouted wheat and roasted whole wheat flour mixed with water.

2. In a pie filling compound, a composition consisting of macerated sprouted wheat from which the coarser materials have been strained, mixed with roasted whole wheat flour and water.

3. A pie filling compound comprising the fine materials resulting from the maceration of selected hard sprouted wheat after passing a fine mesh sieve and mixed with roasted whole wheat flour and water.

In testimony whereof I have hereunto set my hand this 2nd day of February A. D. 1926.

VITUS POTMAKER.